W. BENGEL.
PLUMB AND LEVEL.
APPLICATION FILED JAN. 26, 1921.
1,410,283.
Patented Mar. 21, 1922.
2 SHEETS—SHEET 1.
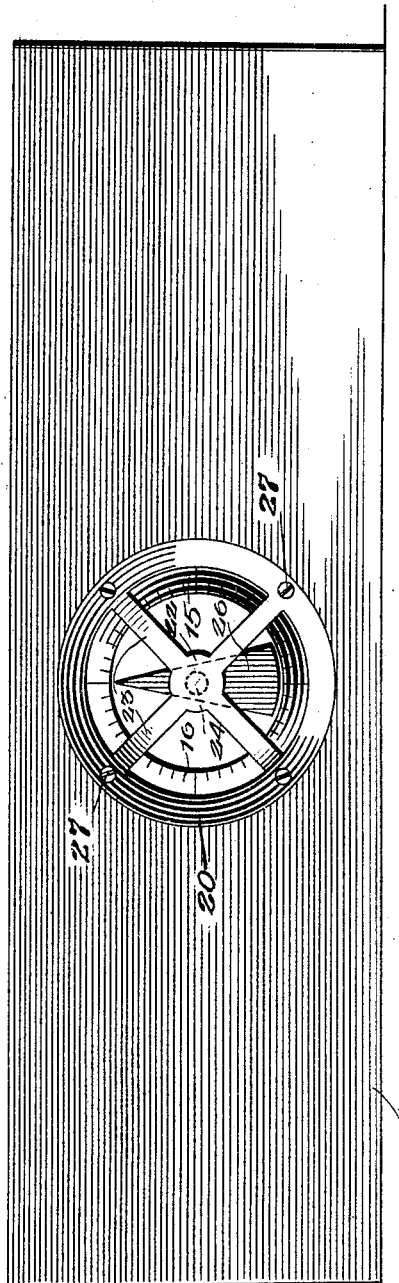
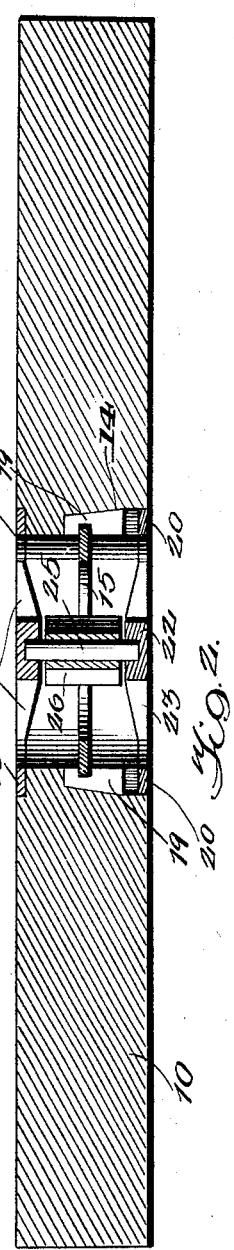
WITNESSES
INVENTOR
WM. BENGEL,
BY
ATTORNEYS

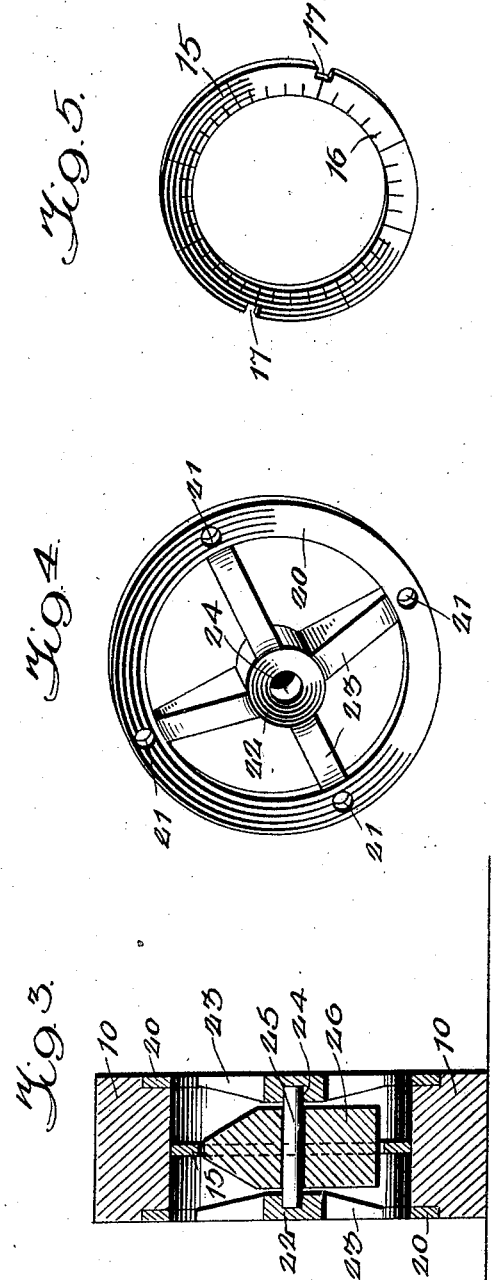
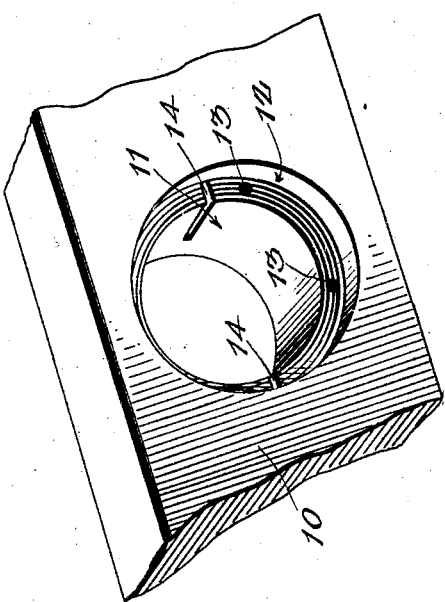
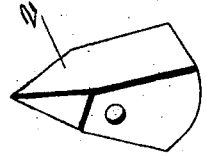
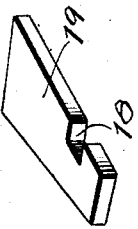

UNITED STATES PATENT OFFICE.

WILLIAM BENGEL, OF NEWPORT, ARKANSAS.

PLUMB AND LEVEL.

1,410,283. Specification of Letters Patent. Patented Mar. 21, 1922.

Application filed January 26, 1921. Serial No. 440,036.

*To all whom it may concern:*

Be it known that I, WILLIAM BENGEL, a citizen of the United States, and a resident of Newport, in the county of Jackson and State of Arkansas, have invented certain new and useful Improvements in Plumbs and Levels, of which the following is a specification.

My present invention relates generally to levels and plumbs, and more particularly to a level which may be manufactured in practically unbreakable form and my object is the provision of an arrangement including a gravity controlled pendulum or plumb-bob by means of which in connection with a graduated ring a practically unbreakable level may be formed which will be unaffected by climatic changes and by means of which a level or indicated degree of inclination may be accurately determined at all times without necessitating adjustment of parts.

In the accompanying drawings which illustrate my invention and form a part of this specification, Figure 1 is a side view of my improved level complete, Figure 2 is a horizontal section therethrough, Figure 3 is a vertical transverse section taken centrally through the level, Figure 4 is a detail perspective view of one of the side plates, Figure 5 is a similar view of a graduated ring, Figure 6 is a perspective view of a portion of the stock with the parts of my invention removed, Figure 7 is a detail perspective view of one of the ring holding wedges, and Figure 8 is a detail perspective view of the pendulum or plumb-bob.

Referring now to these figures and particularly to Figures 1 to 3 inclusive and Figure 6, my invention proposes a stock 10 which may be formed of wood, metal or other suitable material and is for the purposes of my invention provided with a transverse cylindrical bore 11 shown particularly in Figure 6 and has counterbores 12 at the opposite ends of the bore 11, with a circumferential series of apertures 13 opening at their opposite ends into the counterbores 12 and a pair of slots 14 in the wall of the bore 11 at diametrically opposed points.

The bore 11 receives a ring 15 which is preferably disposed at approximately the center thereof in interfitting relation, the opposite faces of which ring have graduations 16 constituting the well known divisions of a circle. In order to hold the ring in place it is provided with diametrically opposed peripheral notches 17 co-acting with notches 18 along the inner edges of a pair of wedge plates 19 which are driven into the slots 14 of the stock 10 and by virtue of their slight taper, become wedged in place and serve to rigidly support the ring in non-rotatable and non-shiftable relation within the bore 11, portions of the ring at opposite sides of the side notches 17 overlapping the upper and lower surfaces of the wedge plate or locking keys 19.

The counterbores 12 receive side plates, each consisting of an outer ring 20, apertured at spaced points 21 to register with the apertures 13 of the stock, and a central hub 22 connected to the ring by radial arms 23. Each hub 22 has an inwardly opening bearing aperture 24 to receive one end of a transverse shaft or pin 25 upon which a pendulum of plumb-bob 26 is loosely rotatable and confined between the side plates for rotation within the graduated ring 15. This pendulum or plumb-bob preferably tapers from one end to the other, so that one end, considerably heavier than the other, is effected by gravity at all times and its opposite smaller end thus constitutes a pointer in conjunction with the graduations of the ring.

Movement of the plumb-bob or pendulum will thus be viewed at all times between the radial arms 23 of each of the side plates, the latter of which are connected by screws or like fastening members 27 which extend through the stock apertures 13 and serve to clamp the side plates and secure the same within the counterbores 12, confining the pendulum 26 between the side plates so that its smaller pointed end will be maintained in properly cooperating relation within the graduated ring 15 at all times.

It obviously becomes unnecessary to utilize glasses or other protecting means and in view of the rigid connection of the parts except as to the desired free movement of the pendulum, it is quite apparent the level as a whole will be strong and durable, may be made of various materials and will be effective and efficient not only for the purpose of indicating levels but for indicating various inclinations with respect to a level without necessitating adjustment for the latter purpose.

I claim:

A level including a stock having a transverse bore and transverse slots at diammetrically opposite sides of the bore, a pair of side plates secured to the stock, a pendulum rotatably supported by and between said side plates, a graduated ring interfitting the bore and disposed around the pendulum, and tapering wedge plates disposed in the slots of the stock, and opposed at their larger ends by one of the side plates said wedge plates and said graduated ring having coacting notches in their adjacent edges whereby to rigidly hold the ring against lateral and circumferential displacement.

WILLIAM BENGEL.